(12) United States Patent
Boonekamp et al.

(10) Patent No.: US 8,556,456 B2
(45) Date of Patent: Oct. 15, 2013

(54) LIGHT EMITTING DEVICE AND LUMINAIRE

(75) Inventors: Erik Boonekamp, Utrecht (NL); Ludo Haenen, Sint Oedenrode (NL)

(73) Assignee: Koninklijke Philips N.V., Eindhoven (NL)

( * ) Notice: Subject to any disclaimer, the term of this patent is extended or adjusted under 35 U.S.C. 154(b) by 107 days.

(21) Appl. No.: 13/260,752

(22) PCT Filed: Mar. 30, 2010

(86) PCT No.: PCT/IB2010/051381
§ 371 (c)(1),
(2), (4) Date: Sep. 28, 2011

(87) PCT Pub. No.: WO2010/113113
PCT Pub. Date: Oct. 7, 2010

(65) Prior Publication Data
US 2012/0026748 A1 Feb. 2, 2012

(30) Foreign Application Priority Data
Apr. 2, 2009 (EP) .................................... 09157182

(51) Int. Cl.
*F21V 9/00* (2006.01)
(52) U.S. Cl.
USPC ............................ 362/231; 362/329; 362/235
(58) Field of Classification Search
USPC ........................... 362/329, 235, 231, 551, 552
See application file for complete search history.

(56) References Cited

U.S. PATENT DOCUMENTS

| 3,762,654 | A | 10/1973 | Haslett et al. |
| 6,540,377 | B1 * | 4/2003 | Ota et al. ....................... 362/231 |
| 6,991,355 | B1 | 1/2006 | Coushaine et al. |
| 7,178,942 | B2 * | 2/2007 | Chen et al. ..................... 362/231 |
| 7,201,494 | B2 * | 4/2007 | You et al. ....................... 362/231 |
| 7,300,175 | B2 | 11/2007 | Brukilacchio |
| 7,352,510 | B2 | 4/2008 | Cummings et al. |
| 2003/0185005 | A1 | 10/2003 | Sommers et al. |
| 2006/0126343 | A1 | 6/2006 | Hsieh et al. |
| 2006/0193137 | A1 | 8/2006 | Chinniah et al. |
| 2007/0115674 | A1 | 5/2007 | Tessnow |
| 2008/0123349 | A1 * | 5/2008 | Chaves et al. ................. 362/329 |
| 2009/0067179 | A1 * | 3/2009 | Chaves et al. ................. 362/329 |

FOREIGN PATENT DOCUMENTS

| EP | 1610054 A2 | 12/2005 |
| JP | 2002251907 A | 9/2002 |
| JP | 2007088377 A | 4/2007 |
| WO | 0140702 A1 | 6/2001 |

* cited by examiner

*Primary Examiner* — Ali Alavi
(74) *Attorney, Agent, or Firm* — John F. Salazar; Mark L. Beloborodov

(57) ABSTRACT

The present invention relates to a light emitting device 100 which employs light sources 102 having a narrow or limited light intensity distribution, and which device is arranged for redistributing the light from the light sources and outputting a light with a broader spatial light intensity distribution via a circumferential light output surface 115 arranged on a funnel-shaped light output portion 112. The light emitting device further comprises a light mixing portion 120 for mixing the light emitted from the light sources 112 before entering into the light output portion 112.

14 Claims, 4 Drawing Sheets

LIGHT EMITTING DEVICE AND LUMINAIRE

FIELD OF THE INVENTION

The present invention generally relates to the field of lighting design, and more particularly to a light emitting device and a luminaire according to the preamble of the independent claims.

BACKGROUND OF THE INVENTION

Traditional incandescent light sources are provided with a tungsten filament which is made to glow by the passage of electric current. The filament is generally suspended near the center of a glass bulb, thereby providing a light intensity which is almost constant in all radial directions. The radial distribution of the light in combination with the high brightness of the filament, have in the past made the incandescent light sources popular for general lighting purposes like for instance for use in chandeliers. The crystals in chandeliers exhibit sparkling light effects which is considered as highly decorative.

However, incandescent light sources suffer from disadvantages such as short life span and a high power consumption. Replacing incandescent light sources with LED light sources may alleviate or eliminate the above mentioned problems and provide a significant increase in efficacy. However, most LEDs are only capable of emitting light into a hemisphere (solid angle, $\Omega=2\pi$ sr), whereas incandescent light sources employing a glowing filament generally emit light uniformly almost into a full sphere (solid angle, $\Omega=4\pi$ sr).

U.S. Pat. No. 7,352,510 discloses a device comprising a first and a second light mixing component which are optically coupled via an optical focusing element for producing a light beam of uniform intensity and irradiance from a single or multi color source, e.g. a LED-array. The first light mixing element produces a uniform irradiance distribution of the light from the multi color source, while leaving the intensity distribution non-homogenous. The focusing element and the second light mixing component are used to homogenize the intensity distribution of the light beam received from the first light mixing element while the light intensity distribution with respect to the optical axis is substantially unaltered.

SUMMARY OF THE INVENTION

In view of the above, it is an object of the present invention to provide a light emitting device and a corresponding luminaire that are capable of redistributing light from light sources having a narrow or limited light intensity distribution and outputting light with at least a broader spatial light intensity distribution.

This object is achieved by a light emitting device and corresponding luminaire according to the present invention as defined in independent claims.

Thus, in accordance with an aspect of the present invention, there is provided a light emitting device comprising a light unit having at least one light source and a light guide unit. The light guide unit comprises a light input portion for receiving light from the light source, a light output portion, and a light mixing portion. The light mixing portion is arranged between the light input portion and the light output portion. Furthermore, the light output portion is funnel-shaped having a base, which is arranged to receive light from the light mixing portion, and an upper surface and a lower surface. The light output portion is further arranged having a circumferential light output surface. The upper surface and the lower surface of the light output portion define a light guide path from the base to the circumferential light output surface.

Thus, there is provided a light emitting device which is arranged for transforming light having a narrow angular light intensity distribution into light with a wider angular light intensity distribution. The light from the at least one light source is mixed in the light mixing portion and then uniformly injected into the funnel shaped light output portion, which is arranged to guide and output light via the circumferential output surface. The configuration thus allows for employing a light source with a narrow angular light intensity distribution, and yet obtaining an outputted angular light intensity distribution substantially similar to the light intensity distribution of an incandescent light source which is desirable in for instance general lighting applications. The disclosed light emitting device may be applied to replace current incandescent bulbs, and may be utilized as high brightness light sources in for instance chandeliers.

According to an embodiment of the light emitting device, the at least one light source is a light emitting diode, LED. LEDs provide a large number of advantages such as long life-time, low energy consumption, small size etc. With the present inventive concept, LEDs can in an advantageous way be utilized in lighting applications in which LEDs have not traditionally been suitable due to their limited angular light intensity distribution.

According to an embodiment of the light emitting device, the upper surface and the lower surface are curved which is advantageous.

According to an embodiment of the light emitting device, the cross section of the light mixing portion is one of hexagonal shaped, and square shaped. These configurations allow for a highly effective mixing of the injected light.

According to an embodiment of the light emitting device, the upper surface is arranged to be a light output. In this configuration, in addition to the circumferential light output, the upper surface of the funnel shaped light output portion contributes to a fuller angular intensity profile of the outputted light from the light emitting device.

According to an embodiment of the light emitting device, the length of the light mixing portion is arranged to allow tuning of the color uniformity of light of a predetermined color. The length of the light mixing portion is advantageously utilized to tune a desired color uniformity when the light unit is arranged with multiple light sources of different colors. For instance, the light sources may be combinations of LEDs of different colors like e.g. cool white in combination with warm white, cool white in combination with amber, red and green and blue (RGB), or red and green and blue and amber (RGBA).

According to an embodiment of the light emitting device, at least a subarea of the surface of the light mixing portion is arranged having an optical micro structure for increasing the light mixing within the light mixing portion. By increasing the light mixing properties of the light mixing portion, the length of the light mixing portion may be decreased. Thus, the size of the light emitting device may be decreased, while yet obtaining a desired mixing of the light.

According to an embodiment of the light emitting device, the circumferential light output surface is arranged perpendicular to the light input portion. Thus, the funnel-shaped light output portion transports the light of the at least one light source towards the circumferential light output surface and changes the main direction of the light and distributes it 90 degrees in all directions which leads to a toroidal light intensity distribution of the outputted light. To make a fuller distribution the light output portion may alternatively be arranged such that some light is allowed to escape from the upper surface of the funnel.

According to an embodiment of the light emitting device, the light unit further comprises at least one collimating element. The radiation profile of light outputted from the light sources affects the final angular light distribution outputted from the device. Collimation of the light from the at least one light source before entering into the light mixing portion allows for increased control of the angular light intensity distribution of light outputted from the light emitting device. By proper collimation substantially all light injected in the light input portion may be transported and outputted via the circumferential light output surface. In addition collimation may also advantageously be utilized to improve in coupling efficiency for light being received by the light input portion.

According to an embodiment of the light emitting device, the circumferential light output surface is curved. By such configuration, the angular light intensity distribution may be further controlled. The angular light intensity distribution may be diverged to allow for a fuller angular light intensity distribution. A desired light intensity distribution may advantageously be achieved by designing the curvature of the circumferential light output surface in a corresponding manner. The curvature may for instance be chosen to be a Belzer curve.

According to an embodiment of the light emitting device, the circumferential light output surface is at least partly arranged with an additional surface structure, which advantageously allows additional control or manipulation of the properties of the outputted light.

According to an embodiment of the light emitting device, the additional surface structure is one of a refractive structure, a holographic structure, a thin particle coating, and a rough surface for adapting the outputted light to fit for a predetermined lighting application. As an example the circumferential light output surface may be provided with a forward scattering structure which distributes the angular intensity distribution for incident rays into a Lambertian profile which is desirable for general lighting applications. This may be efficiently achieved by means of a holographic structure.

According to an embodiment of the light emitting device, the light unit further comprises a reflector. The reflector may be arranged to reflect light from the light sources towards the light mixing portion, thus increasing the amount of light being injected into the light mixing portion, and thereby subsequently increasing the total flux of the light output from the light emitting device.

According to an embodiment of the light emitting device, the device is further adapted to retrofit into a luminaire employing an incandescent light source. Thus, the device of the present invention may advantageously be used for replacing an incandescent light source or for fitting into a light fixture normally used for incandescent light sources, such as a filamented light bulb, a halogen lamp etc., which is advantageous as a user may conveniently replace expensive and inefficient incandescent light sources in existing luminaires with light emitting devices in accordance with the present inventive concept.

According to a second aspect of the present invention, there is provided a luminaire comprising at least one light emitting device. The luminaire shows the corresponding benefits as described for the light emitting device.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which the same reference numerals are used for identical or similar elements, wherein.

DESCRIPTION OF PREFERRED EMBODIMENTS

Embodiments of the present invention will now be described more fully hereinafter and with reference to the accompanying drawings, in which certain embodiments of the invention are shown. This invention may, however, be embodied in many different forms and should not be considered as limited to the embodiments set forth herein. The embodiments are provided by way of example so that this disclosure will be thorough and complete, and will fully convey the scope of the invention to those skilled in the art. Like numbers refer to like elements throughout.

Figures 1A, 1B:
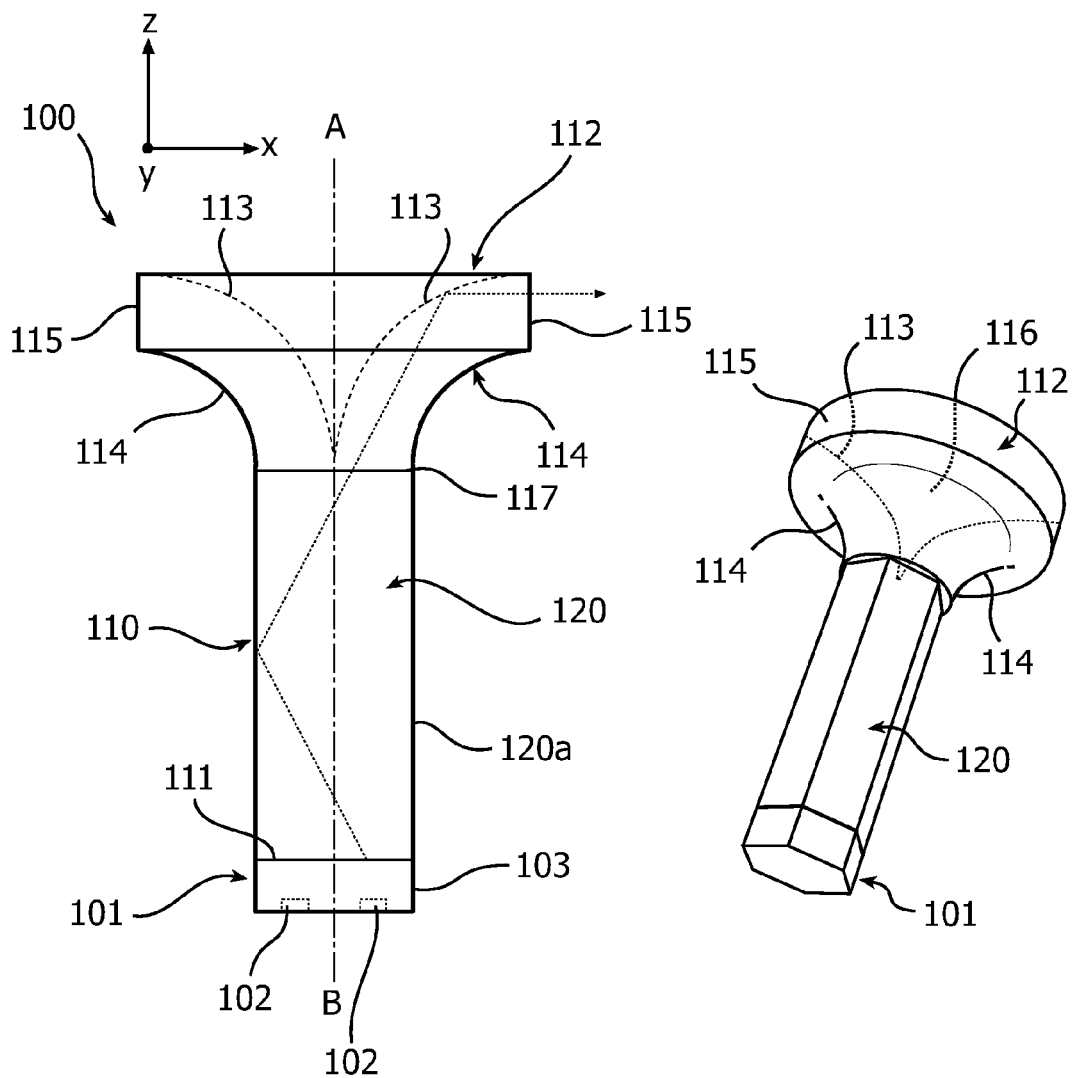
FIG. 1a is a schematic cross-sectional view of an embodiment of a light emitting device in accordance with the present invention.
FIG. 1b is a schematic perspective side view of an embodiment of a light emitting device in accordance with the present invention.

FIG. 1a illustrates a schematic cross-sectional view of an embodiment of the light emitting device in accordance with the present invention. The light emitting device 100 comprises a light unit 101, which is arranged having two light sources 102. The light sources are here mounted on a reflector 103. In this exemplifying embodiment Lambertian LEDs are utilized as light sources 102. A Lambertian LED is an optical source that obeys Lambert's cosine law, $$I = I_0 \cos(\alpha), \qquad \text{Eq. 1,}$$

wherein $\alpha$ equals the viewing angle, and $I_0$ the light intensity at $\alpha=0$, i.e. normal to the LEDs. As can be deducted from Eq. 1, the light intensity at a viewing angle close to $\alpha=90$ is very low. Examples of commercially available Lambertian LEDs are the Luxeon Rebel or Luxeon K2 LEDs.

It should be noticed that other types and numbers of light sources are applicable in the light emitting device and are considered to fall within the scope of the present inventive concept. Furthermore, different colors of the light sources and/or combinations of colors of the light sources are applicable in the light emitting device according to the present invention.

Further, the light emitting device 100 comprises a light guide unit 110, which comprises an elongated light mixing portion 120 and a light output portion 112. The light mixing portion 120 may be e.g. cylindrical. The light mixing portion 120 is arranged at the light unit 101. It is further arranged to receive light emitted by the light sources 102 at a first end via a light input portion 111, e.g. a surface of the light mixing portion, and to mix the received light as it is transported through the light mixing portion 120 and along the principal optical axis oa which is extending along and parallel to the light mixing portion 120, and subsequently to uniformly inject the mixed light into the light output portion 112.

Suitable materials for the light guide unit 110 may be transparent polymers, like e.g. polycarbonate (PC), polyumetylmethacrylate (PMMA), polyethylene terephthalate (PET), acrylics, glass or any combination thereof.

The light output portion 112 is funnel shaped. The base 117 of the light output portion 112 is arranged to receive the mixed light from the light mixing portion 120. Furthermore, a lower surface 114 and an upper surface 113 of the funnel shaped light output portion 112 define a circumferential light path for transporting light. A circumferential light output surface 115 is arranged at the top rim of the funnel shaped light output portion 112, thereby providing a light output surface for the light path defined by the upper surface 113 and the lower surface 114 guides light. In this exemplifying embodiment, the circumferential light output surface 115 is a flat surface arranged perpendicular to the optical axis. The upper surface 113 and the lower surface 114 are in this exemplifying embodiment curved, such that the upper surface 113 is convex and the lower surface 114 is concave.

In alternative embodiments the flat surface may be arranged having another predetermined angle with respect to the optical axis (not shown). As an example a predetermined angle larger than 90 provides an effective way of arranging a more down lighting system (e.g. 60% flux below "horizon" and 40% flux above horizon). In the same manner an up lighting system is achievable by arranging the predetermined angle to be less than 90 degrees.

Figure 1C:
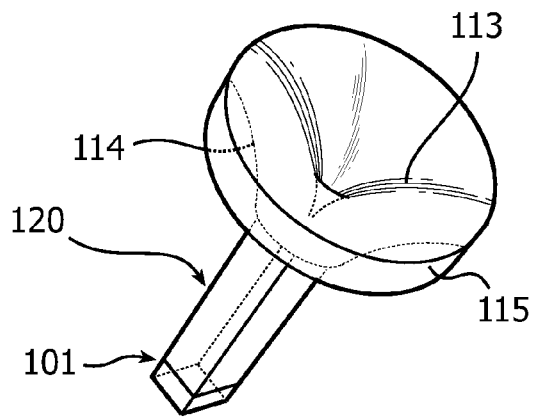
FIG. 1c is a schematic perspective side view of an embodiment of a light emitting device in accordance with the present invention.

Referring now to FIG. 1b, which illustrates a schematic perspective side view of an embodiment of a light emitting device in accordance with the present invention, the light mixing portion 120 has a hexagonal cross section when viewed in the xy-plane. In an embodiment of the light emitting device as illustrated in FIG. 1c, the light mixing portion 120 has a square cross section when viewed in the xy-plane. Both of these shapes of the cross section provide effective light mixing for mixing of light of different colors.

According to an embodiment of the light emitting device, the light mixing portion 120 is optionally provided with an optical micro structure for increasing the light mixing properties of the light mixing portion 120. The optical micro structure may be arranged on the surface 120a of the light mixing portion 120, see FIG. 1a. By increasing the light mixing properties, the required length of the light mixing portion 120 may be shorted.

According to an embodiment of the light emitting device, the length of the light mixing portion 120 is arranged to allow tuning of the color uniformity of light of a predetermined color. As an illustration, the length of the light mixing portion may be tuned to allow high mixing for light from a cool white LED and an amber LED. Thereby, the mixed light may achieve a color uniformity suitable of simulating the appearance of an incandescent lamp.

Figure 2:
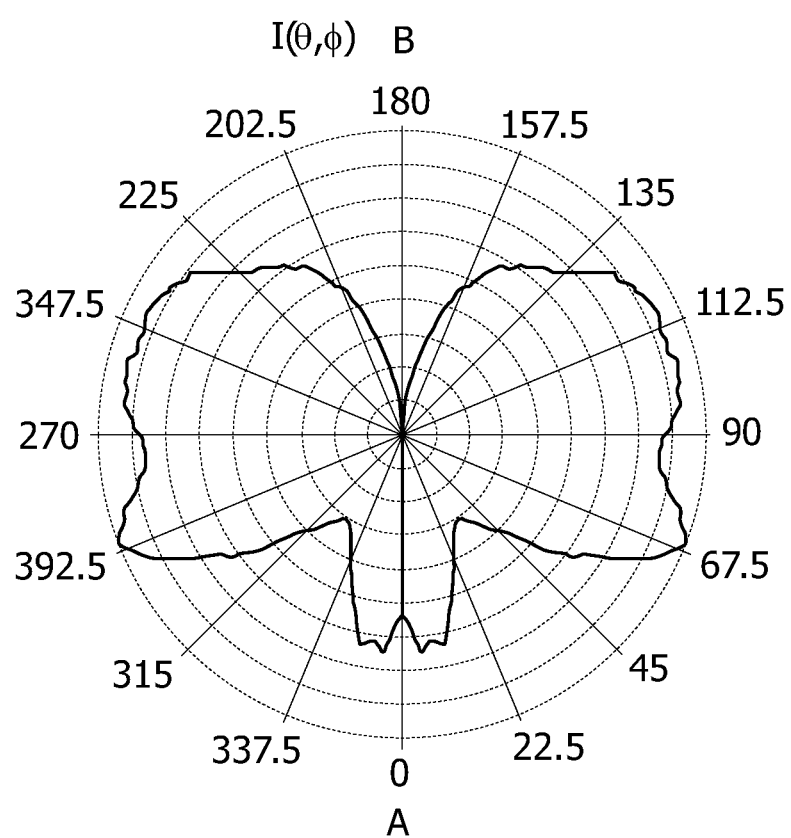
FIG. 2 illustrates an exemplary light intensity profile of the far-field angular light intensity distribution of light emitted from an embodiment of a light emitting device in accordance with the present invention.

FIG. 2 illustrates an exemplary light intensity profile of the far-field angular light intensity distribution $I(\theta, \phi)$ projected onto the xz-plane of light being emitted from the light emitting device 100 of a light emitting device in accordance with the present invention as previously described. Here, $\phi$ represents the polar angle with respect to the z-axis and $\theta$ represents the azimuthal coordinate in the xy-plane from the x-axis. In this exemplifying embodiment, the z-axis coincides with the z-axis, and the orientation of the device is illustrated in FIGS. 1a and 2 by indicating A and B for the positioning of the top and the bottom of the light emitting device, respectively. The full three-dimensional intensity is a surface of revolution around the z-axis.

Figures 3A, 3B:
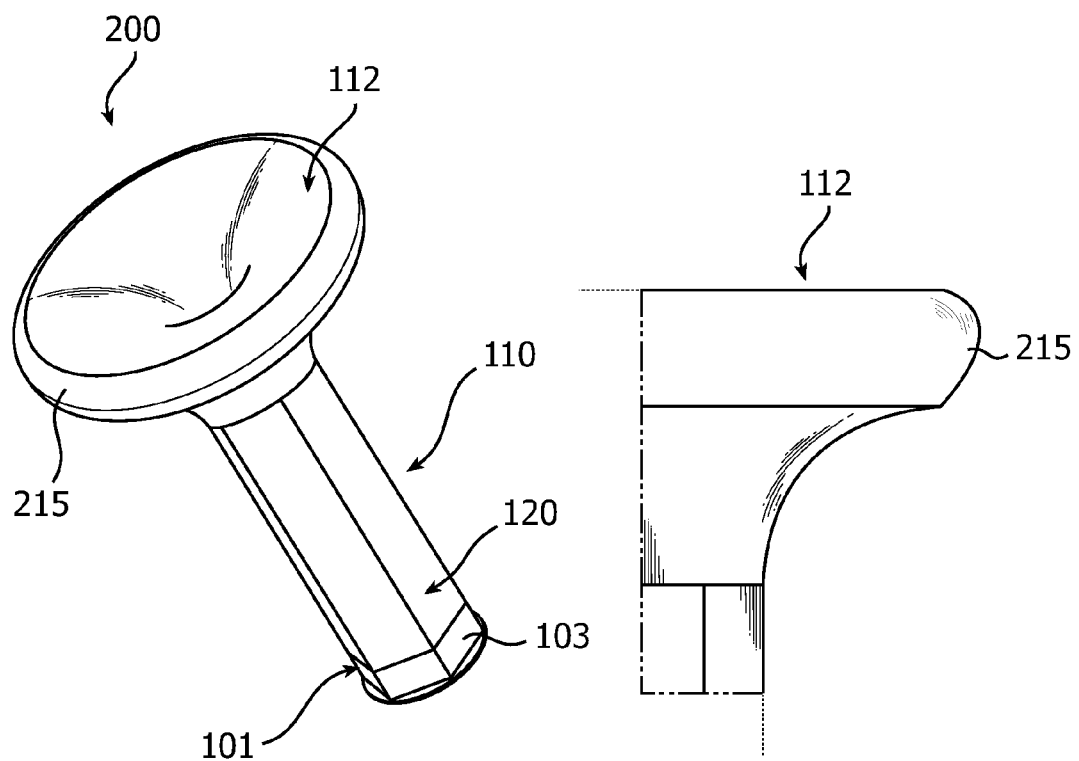
FIG. 3a is a schematic perspective side view of an embodiment of a light emitting device in accordance with the present invention.
FIG. 3b is a close up view of a detail of the light output portion of an embodiment of the light emitting device in accordance with the present invention.
Figure 3C:
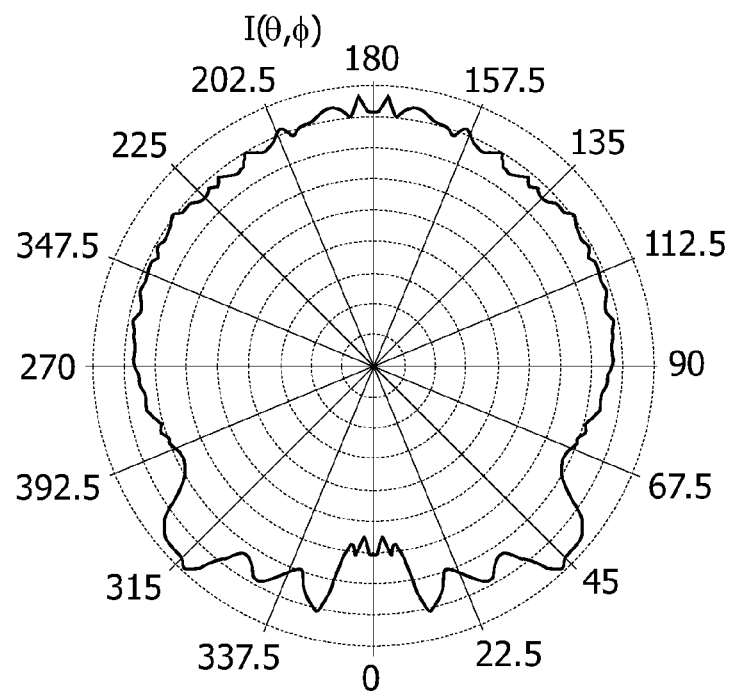
FIG. 3c illustrates an exemplary light intensity profile of the far-field angular light intensity distribution of light emitted from an embodiment of a light emitting device in accordance with the present invention.

The light intensity distribution profiles shown in FIG. 2 and FIG. 3c have been produced by modeling the embodiment 100 as illustrated in FIG. 1b and FIG. 3, respectively, using ray tracing software from Optical research Associates (LightTools®).

The main part of the light being injected from the light mixing portion 112 to the light output portion is outputted via the circumferential light output surface 115. However, the upper surface 113 is in embodiments of the light emitting device 100 arranged to provide an additional light output. Hence, as an example 10-20% of the light may be outputted via the upper surface 113, which consequently contributes to an increased width of the angular light intensity profile. In the angular light intensity distribution for the exemplary embodiment, which is described with reference to FIG. 1b, and which angular intensity distribution is illustrated in FIG. 2, the contribution of light outputted from the upper surface 113 is represented by the intensity distribution along the optical axis (direction towards A in FIG. 2).

The radiation profile of the light sources 102 can affect the angular light intensity profile of the light outputted from light emitting device 100, 200.

According to an embodiment of the light emitting device, the light unit 101 is further provided with a collimating element (not shown), being for instance a collimating lens or mirror, to increase the control of the angular light intensity distribution of light being outputted from the light emitting device 100, 200.

In an alternative embodiment of the light emitting device, a low curvature of the lower surface 114 and upper surface 113 is arranged to ensure that substantially all light injected in the light output portion 112 is guided via the curved light guiding part and is subsequently outputted via the circumferential light output surface 115. The orientation of the circumferential light output surface 115 in the exemplifying embodiments makes an angle of about 90 degrees with respect to the base 117 of the light output portion 112, as well as to the light input portion 111. The funnel-like element transports the light of at least one light source, e.g. a (Lambertian) LED source, towards the circumferential light output 115 and thereby alters the main direction of the light by 90 degrees in all directions. This leads to a toroidal intensity distribution of the outputted light (see FIG. 2). To make a full distribution some light is allowed to escape from the upper surface 113 of the funnel-shaped light output portion.

In another exemplifying embodiment of the light emitting device, as illustrated in FIG. 3a, a light emitting device 200 which provides an almost perfect omnidirectional angular light intensity distribution is disclosed. The device 200 comprises a light unit 101 and a light guide unit 110, and is in its basic construction configured similarly to the pervious exemplifying embodiment which was described with reference to FIG. 1b. The light unit 101 is arranged having a reflecting cavity 103 in which two LEDs (Lambertian with a sharp cut-off at 2×30 degrees) are arranged. The light from the light sources is collimated by a collimating structure (not shown) before being injected in the light mixing portion 120.

Furthermore, the light output portion 112 is arranged having a curved circumferential light output surface 215, see close-up in FIG. 3b. The curved circumferential output surface 215 is described by a Bezier curve. In alternative embodiments other shapes of the curved circumferential output surface 215, are applicable. The light output surface 215 is further arranged having a forward scattering structure, which distributes incident light into a Lambertian profile. The forward scattering structure is here a holographic structure. In alternative embodiments, a thin layer of particles, e.g. particles of $TiO_2$, $ZrO_2$ or a porous polymer, or a rough structure may be arranged on the light output surface 215 to redistribute the angular light intensity distribution.

Refractive and/or holographic structures can be incorporated in the manufacturing of the device, for instance when utilizing injection moulding by providing the casting mould with the corresponding structures. Thin layers of particles may be arranged by thin film techniques, sputtering etc.

FIG. 3c illustrates an exemplary light intensity profile of the far-field angular light intensity distribution of light emitted from the embodiment 200 of the light emitting device in accordance with the present invention. Here the light intensity distribution is nearly omnidirectional with a substantially even angular light intensity distribution.

The present invention further relates to a luminaire comprising a light emitting device 100, 200 as described above.

Figure 4:
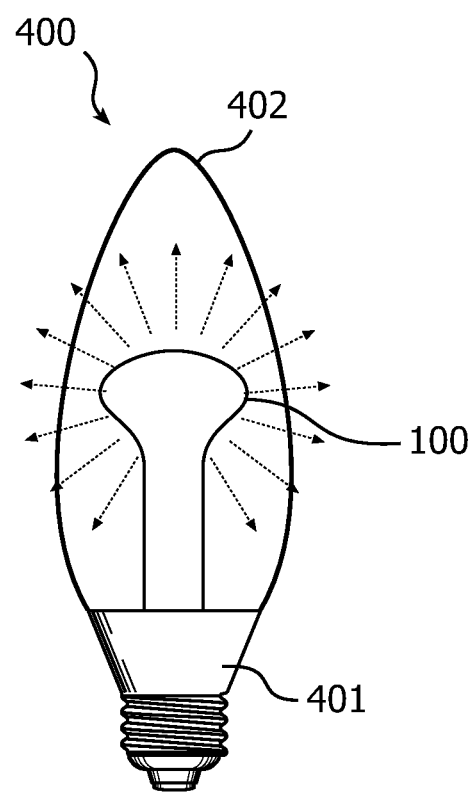
FIG. 4 illustrates an exemplary lamp comprising a light emitting device according to the present invention.

According to an embodiment of the light emitting device the device is further adapted to retrofit into a luminaire intended for employing an incandescent light source, i.e. adapted to fit into a light fixture normally used for incandescent light sources, such as a filamented light bulb, a halogen lamp, etc. Thus, replacement of the incandescent light source in such luminaires with the light emitting device according to the present invention is made possible. FIG. 4 illustrates an exemplifying embodiment of a light emitting device adapted for retrofit 400. The light emitting device 400 is arranged having a foot 401 for engaging in a light fixture normally used for incandescent light sources. The foot 401 is arranged to engage with the light emitting device 100, 200 mechanically and electrically. The foot 401 will further help to remove heat generated by the light sources. Alternatively the light unit 101 is arranged having a separate heat sink (not shown). The light emitting device 400 is optionally arranged with a glass bulb 402, e.g. for giving the impression of a candle flame in a chandelier, and to protect the optical element from touching, dust, and dirt.

Above, embodiments of the light emitting device according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A light emitting device comprising:
    a light unit having at least one light source; and
    a light guide unit;
    said light guide unit comprising:
    a light input portion for receiving light from said light source,
    a light output portion; and
    a light mixing portion arranged between the light input portion and the light output portion and reflecting light along an interior surface;
    said light output portion being funnel-shaped comprising:
    a base arranged to receive light from said light mixing portion;
    a convex light emitting upper surface;
    a concave lower surface; and
    a circumferential light output surface arranged substantially perpendicular to the light input portion;
    said light output surface interposed between said upper and lower surfaces;
    wherein said upper surface and said lower surface define a light guide path from said base to said circumferential light output surface to create a substantially toroidal intensity distribution.

2. A light emitting device according to claim 1, wherein said at least one light source is a light emitting diode.

3. A light emitting device according to claim 1, wherein the cross section of said light mixing portion is one of hexagonal shaped, and square shaped.

4. A light emitting device according to claim 1, wherein said upper surface is arranged to be a light output.

5. A light emitting device according to claim 1, wherein the length of the light mixing portion is arranged to allow tuning of the color uniformity of light of a predetermined color.

6. A light emitting device according to claim 1, wherein at least a subarea of the surface of the light mixing portion is arranged having an optical micro structure for increasing the light mixing within the light mixing portion.

7. A luminaire comprising at least one light emitting device, according to claim 1.

8. A light emitting device according to claim 1, wherein said light unit further comprises at least one collimating element.

9. A light emitting device according to claim 1, wherein the circumferential light output surface is curved.

10. A light emitting device according to claim 1, wherein the circumferential light output surface is at least partly arranged with an additional surface structure.

11. A light emitting device according to claim 10, wherein said additional surface structure is one of a refractive structure, a holographic structure, a thin particle coating, and a rough surface.

12. A light emitting device according to claim 1, wherein said light unit further comprises a reflector.

13. A light emitting device according to claim 1, further adapted to retrofit into a luminaire employing an incandescent light source.

14. A light emitting device comprising:
    a light unit having at least one light emitting diode positioned to output light into a light guide;
    said light guide having a light input area which receives light from said at least one light emitting diode;
    said light guide having an opposing end from said light input area forming a light output area;
    said light guide further having an elongated light mixing chamber interposed between the light input area and the light output area and reflecting light along an interior surface;
    said light guide interior surface formed from a plurality of substantially flat walls;
    a light output structure receiving light from said light output area of said light guide, said light output structure being funnel-shaped and including a base arranged to receive light from said light mixing chamber;

said light output structure further having a convex light emitting upper surface and a concave lower surface;
a circumferential light output surface on said light output structure arranged substantially perpendicular to the light input area of the light guide;
said circumferential light output surface interposed between said convex upper surface and concave lower surface;
wherein said upper surface and said lower surface define a light guide path from said base to said circumferential light output surface to create a substantially toroidal intensity distribution.

* * * * *